United States Patent [19]

Kosuge

[11] Patent Number: 4,692,866
[45] Date of Patent: Sep. 8, 1987

[54] AUTOMATIC SHIFT CONTROL SYSTEM
[75] Inventor: Shuichi Kosuge, Nagoya, Japan
[73] Assignee: Nippondenso Co., Ltd., Kariya, Japan
[21] Appl. No.: 701,222
[22] Filed: Feb. 13, 1985
[30] Foreign Application Priority Data Feb. 14, 1984 [JP] Japan ................... 59-26845

[51] Int. Cl.⁴ ................ F16H 5/66; B60K 41/06; G06F 15/50
[52] U.S. Cl. .................... 364/424.1; 74/866
[58] Field of Search ............ 364/424.1, 424; 180/172.76; 74/866

[56] References Cited

U.S. PATENT DOCUMENTS

| 4,470,489 | 9/1984 | Makita | 180/76 |
| 4,490,790 | 12/1984 | Shinoda | 364/424.1 |
| 4,519,274 | 5/1985 | Maruyama et al. | 74/866 |
| 4,523,281 | 6/1985 | Noda et al. | 74/866 X |
| 4,558,414 | 12/1985 | Sakakiyama | 364/424.1 |
| 4,564,906 | 1/1986 | Stephan et al. | 364/424.1 |

FOREIGN PATENT DOCUMENTS 48-9729  3/1973  Japan .................. 364/424.1

Primary Examiner—Felix D. Gruber
Attorney, Agent, or Firm—Cushman, Darby & Cushman

[57] ABSTRACT

In an automatic shift control system for a vehicle equipped with an automatic transmission, during the control of the gear ratio of the automatic transmission in accordance with a shift pattern predetermined in accordance with the driving conditions of the vehicle, the shift pattern is corrected in a gear ratio downshifting direction in response to a curved running detection signal detecting the curved running of the vehicle.

5 Claims, 4 Drawing Figures

AUTOMATIC SHIFT CONTROL SYSTEM

BACKGROUND OF THE INVENTION

The present invention relates to an automatic shift control system for automatically controlling the gear ratio of an automatic transmission of a vehicle, such as, an automobile.

Conventional systems of this type have been so designed that the running speed and the throttle opening of a vehicle are detected and the desired gear ratio region is determined in accordance with a shift pattern predetermined in accordance with these parameters thereby performing the desired multiratio gear shifts in response to such determinations. When a vehicle equipped with this automatic shift control system is run on a curved road, the vehicle is decelerated by releasing the accelerator pedal just before the curved road and in this condition the vehicle goes around the curve. Then, when the acceleration pedal is again depressed for acceleration near the end of the curve, downshifts of the transmission are effected in response to changes in the opening of the throttle valve linked to the pedal. However, this downshifting is delayed in time as compared with optimal operation of a manual transmission with which such downshifts are best performed manually at the beginning or in the middle of the curve. The delayed downshifting with an automatic transmission delays acceleration near the end of the curved road thus failing to ensure a smooth acceleration. The delayed downshifting also decreases the effectiveness of engine braking due to the downshifting on a descending curved road in addition to the abovementioned deficiencies.

SUMMARY OF THE INVENTION

With a view to overcoming the foregoing deficiencies in the prior art, it is an object of the present invention to provide an improved automatic shift control system so designed that the gear ratio of a transmission is rapidly downshifted on curves thereby ensuring the desired engine braking during the curve and a smooth acceleration from around the end of the curve.

To accomplish the above object, in accordance with the invention there is provided an automatic shift control system for controlling the gear ratio of an automatic transmission in accordance with a predetermined shift pattern, which include sensing means for sensing the curved running of a vehicle and controlling means responsive to the curved running detection signal to correct the shift pattern in a direction tending to downshift the gear ratios thereby rapidly controlling the downshifting of the automatic transmission upon coming into the curve.

DESCRIPTION OF THE PREFERRED EMBODIMENTS

Figure 1:
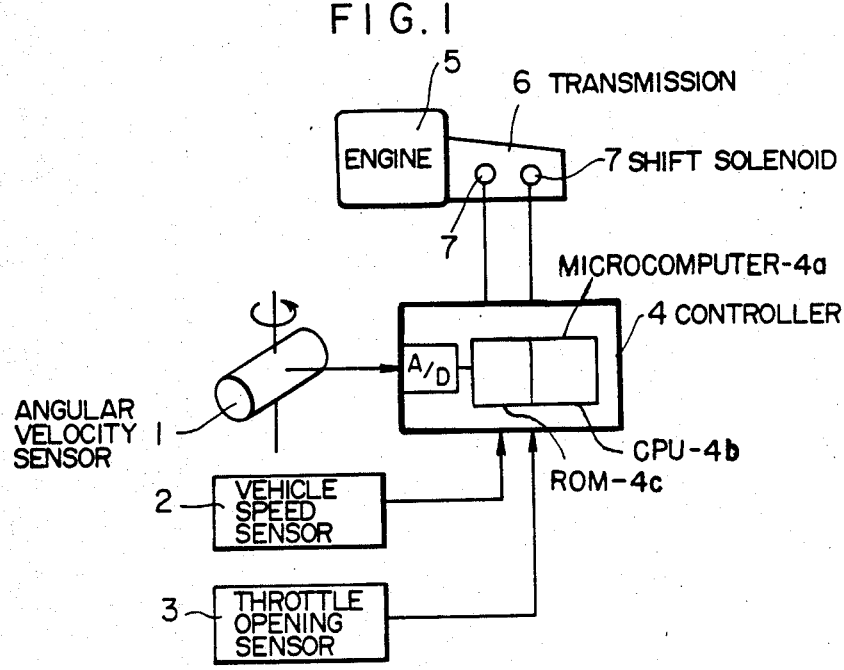
FIG. 1 is a schematic block diagram showing the overall construction of an embodiment of the invention.

The present invention will now be described in greater detail with reference to the illustrated embodiments. Referring to FIG. 1, numeral 1 designates an angular velocity sensor (e.g., the angular rate sensor, part No. A131-1A, manufactured by Watson Industries Inc., U.S.A.) for sensing the swinging angular velocity (yawing rate) of the body of a vehicle, e.g., automobile to generate an angular velocity signal corresponding to its magnitude. Numerals 2 and 3 respectively designate a vehicle speed sensor for vehicle speed sensing purposes and a throttle opening sensor for engine load sensing purposes which are used for the ordinary electronically controlled automatic shift control and they detect the driving conditions of the vehicle. Controlling means such as controller 4 includes a microcomputer 4a which is responsive to the signals from the angular velocity sensor 1, the vehicle speed sensor 2 and the throttle opening sensor 3 to determine the corresponding region of the three-speed gear ratios in the shift characteristic diagram of FIG. 2 and generate shift command signals for shifting the gear ratio. The microcomputer 4a of controller 4 includes a ROM 4c for storing the shift characteristics illustrated in FIG. 2, a central processing unit 4b for performing the required computational operations, etc. Numeral 5 designates the engine of the vehicle for transmitting the power to the driving wheels through an automatic transmission 6. The automatic transmission 6 includes two shift solenoids 7 for changing the three-speed gear ratios and a shift command signal is applied from the controller 4 to each of the shift solenoids 7 for performing a shift operation.

Figure 2:
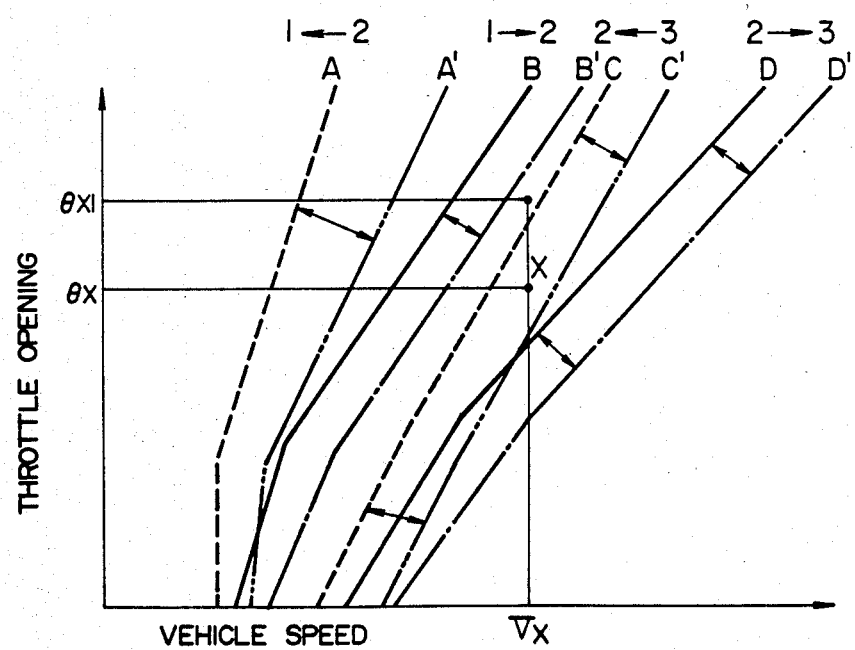
FIG. 2 is a shift characteristic diagram showing the shift lines of the embodiment shown in FIG. 1.

Referring now to the shift characteristic diagram of FIG. 2 stored in the ROM 4c of the controller 4, the abscissa represents the vehicle speed V and the ordinate represents the throttle opening $\theta$. Shift lines A, B, C and D respectively represent the regions of 2-1 downshift, 1-2 upshift, 3-2 downshift and 2-3 upshift whereby when an angular velocity signal is generated from the angular velocity sensor 1, it is determined that the vehicle is on a curve and a correction is made by changing the shift lines A to D to shift lines A' to D', respectively, in accordance with the angular velocity $\omega$ to effect the shift control during the curve.

With the construction described above, the operation of the emboidment will now be described with reference to the flow chart of FIG. 3.

Figure 3:
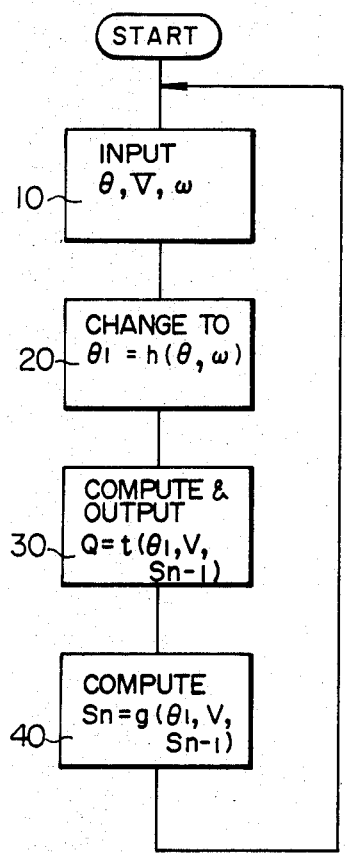
FIG. 3 is a flow chart showing the computational operations of the controller in the embodiment of FIG. 1.

FIG. 3 shows the computational operations of the microcomputer 4a forming the controller 4. At a step 10, the throttle opening $\theta$, the vehicle speed V and the angular velocity $\omega$ are inputted first. The throttle opening $\theta$ is either inputted as such if the sensor is of the type generating its output digitally or after A/D conversion if the sensor is of the type generating its output in analog form. The vehicle speed V is obtained by measuring pulses from the vehicle speed sensor 2 in terms of the internal reference clocks of the controller 4. The angular velocity $\omega$ is first subjected to A/D conversion and then taken into the microcomputer 4a. Then, at a step 20, using a function h ($\theta$, $\omega$), the throttle opening $\theta$ is converted to a calculated or apparent throttle opening $\theta_1$ in accordance with the actual throttle opening $\theta$ and the angular velocity $\omega$. While the function h ($\theta$, $\omega$) is dependent on the characteristics of the transmission and the vehicle and the original shift pattern making it impossible to determine the optimum function unconditionally, it may for example be such that $\theta_1 = (1 + |\omega/\omega_0|)\theta$ where $\omega_0$ is a constant. Then, steps 30 and 40 are computational operations for the shift operation. At the step 30 the on-off operations of the shift solenoids 7 included in the automatic transmission 6 are determined in accordance with the shift characteristic of FIG. 2 in response to the apparent throttle opening $\theta_1$, the vehicle speed V and the states $S_{n-1}$ of the shift solenoids 7 and outputted as the operation instruction Q to operate the shift solenoids 7. Also, at the step 40, the present states $S_n$ of the shift solenoids 7 are computed and stored so as to be used at the step 30 next time.

As a result, when the vehicle is running straight, the angular velocity $\omega = 0$ and $\theta = \theta_1$ thus causing the vehicle to start in the first speed of the shift positions by the computation of FIG. 3. As the vehicle speed V is increased so that the shift line B is exceeded, the shift solenoids 7 each changes its on or off state and an upshift from the first speed to the second speed is effected. When the vehicle speed is increased further so that the shift line D is exceeded, the shift solenoids 7 again change their states and an upshift from the second speed to the third speed is made thereby bringing the vehicle into a steady-state running. In contrast, where the vehicle is to be braked and stopped from the steady-state running, as the vehicle speed V is decreased so that the shift line C is crossed, the shift solenoids 7 change their states and a downshift from the third speed to the second speed is effected. When the vehicle speed V is decreased further so that the shift line A is crossed, the shift solenoids 7 again change their states and a downshift from the second speed to the first speed is effected.

The vehicle is run by repeating these ordinary automatic shift operations and if, for example, the vehicle running in a condition of a vehicle speed $V_x$ and a throttle opening $\theta_x$ at a point X in the shift characteristic diagram of FIG. 2, i.e., the third speed, comes into a curve so that an angular velocity signal is generated from the angular velocity sensor 1, the throttle opening $\theta_x$ is changed to $\theta_{x1}$ in accordance with the angular velocity $\omega$ and thus the shift line C is crossed causing a downshift from the third speed to the second speed. This change from the throttle opening $\theta_x$ to the apparent value $\theta_{x1}$ causes in fact a change from the shift lines A, B, C and D to the shift lines A', B', C' and D' in accordance with the angular velocity $\omega$. In other words, upshifts and downshifts are effected at smaller throttle openings and higher vehicle speeds. This correction by shift-line change causes the point X to cross the shift line C' and at this time a downshift from the third speed to the second speed is effected.

Therefore, when the vehicle comes into a curve, the shift lines are changed for correction in the downshifting direction so that during the early period after the transition into or in the course of the curve downshifting control is effected so that suitable engine braking is ensured and the vehicle runs smoothly on the curved road. Thus, the downshifts are completed by the time that the vehicle is accelerated from around the end of the curved road thus ensuring a smooth acceleration.

Figure 4:
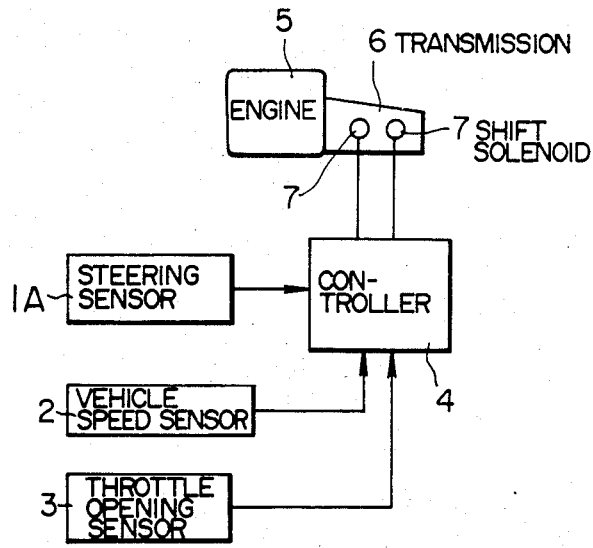
FIG. 4 is a schematic block diagram showing the overall control of another embodiment of the invention.

Referring now to FIG. 4, there is illustrated another embodiment of the invention in which the angular velocity sensor 1 is replaced with a steering sensor 1A and a steering signal corresponding to the angle on the vehicle steering wheel is applied to the controller 4. Thus, a steering signal is generated slightly prior to the occurrence of an angular velocity in the vehicle body and therefore the desired downshifting control is effected rapidly during the early period after entering a curve.

While, in the above-described embodiments, the automatic transmission 6 is of the three-speed type, the invention is also applicable to other multispeed transmissions such as four-speed and five-speed transmissions as well as stepless or continuous variable transmissions. Also, the switching between the shift characteristics needs not necessarily be effected by changing the throttle openings and it may be effected by changing the vehicle speeds. Alternatively, a plurality of shift characteristics may be stored in the memory so that any desired one of the shift characteristics is selected in accordance with the degree of a curved road and the shift control is effected in accordance with the selected characteristic.

Also, while the angular velocity sensor 1 or the steering sensor 1A is used as sensing means for sensing that a vehicle is on a curve, it is possible to use other means for discriminating a curved road by a change in the signal from a lateral acceleration sensor for sensing the lateral acceleration of the vehicle body, a steering wheel sensor for directly sensing the displacement of the steering wheel or an earth's magnetic field sensor for sensing the direction of the earth's magnetic field.

Still further, while the controller 4 is of the electronically controlling type employing a microcomputer, it may be of the mechanically controlling type employing a hard-logic digital control circuit, analog control circit for performing analog signal processing or hydraulic circuit.

From the foregoing description it will be seen that in accordance with the present invention the required shift pattern for the automatic shift control is corrected in a downshifting direction in response to a curve detection signal from sensing means for sensing a curve and thus there is a great advantage of realizing an automatic shift control which ensures that the desired downshift control is effected as soon as the vehicle comes into the curve thereby ensuring the desired engine braking during the curve and smooth acceleration from around the end of the curve.

What is claimed is:

1. A control system for an automatic transmission of a vehicle comprising:
   speed sensing means for sensing a running speed of said vehicle;
   load sensing means for sensing a load of an engine of said vehicle;
   curve sensing means for sensing when said vehicle is moving along a curve; and
   controlling means, coupled to said speed sensing means, load sensing means and curve sensing means for: (1) commanding said automatic transmission to shift in accordance with a first pattern based on vehicle speed and engine load detected by said speed sensing means and load sensing means, respectively, when said curve sensing means senses that said vehicle is not moving along a curve, and (2) commanding said automatic transmission to shift in accordance with a second pattern based on vehicle speed and engine load when said curve sensing means senses said vehicle is moving along a curve, said second pattern causing said automatic transmission to shift at higher vehicle speeds and at lower loads than said first pattern.

2. A system according to claim 1, wherein said curve sensing means comprises a sensor mounted on said vehicle for producing a swinging output varying with an angular velocity of said vehicle.

3. A system according to claim 1, wherein said curve sensing means comprises a steering sensor for producing a steering signal corresponding to an angle on the vehicle steering wheel.

4. A control system for an automatic transmission of a vehicle comprising:
   speed sensing means for sensing a running speed of said vehicle;
   throttle sensing means for sensing an opening angle of a throttle valve of an engine of said vehicle;
   curve sensing means for sensing an angular velocity of said vehicle;
   means for storing a shift pattern of said automatic transmission in relation to the running speed of said vehicle and the opening angle of said throttle valve;
   controlling means, coupled to said speed sensing means, throttle sensing means, curve sensing means and storing means, for: (1) correcting said sensed opening angle of said throttle valve in accordance with the sensed angular velocity of said vehicle so that a corrected opening angle of said throttle valve increases with the increase in the angular velocity of said vehicle and (2) commanding shifts of said automatic transmission in response to the sensed running speed of said vehicle and the corrected opening angle of said throttle valve based on said stored shift pattern.

5. A control system for automatic transmission of a vehicle, comprising a first sensor for sensing a running speed of said vehicle, a second sensor for sensing an opening angle of a throttle valve of an engine of said vehicle, a third sensor for sensing an angular velocity of said vehicle, automatic transmission means for transmitting drive power from said engine to drive wheels of said vehicle, and
   control means, coupled to said first sensor, said second sensor, said third sensor, and said automatic transmission means, for controlling shifting of the amount of transmitted drive power to said wheels,
   said control means comprising: a memory for storing at least one reference shifting pattern in accordance with vehicle-running-speed and reference throttle-opening angle over at least one predetermined range of vehicle running speeds, and processing means for: (1) determining a target throttle-opening angle from a given function of sensed throttle opening angle and vehicle angular velocity, (2) generating shift commands based upon said reference shifting pattern and a previous state of said automatic transmission means, said target throttle-opening angle and said sensed running speed; and (3) updating the present state of said automatic transmission means;
   wherein said target throttle-opening angle cooperates with said reference shifting pattern to cause shifting at higher running speeds and smaller sensed throttle opening angles as angular velocity increases.

* * * * *